(12) United States Patent
Libera

(10) Patent No.: US 6,995,807 B2
(45) Date of Patent: Feb. 7, 2006

(54) MICRO-POWER STAND-BY MODE

(75) Inventor: John Libera, Fallbrook, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 543 days.

(21) Appl. No.: 10/007,925

(22) Filed: Nov. 2, 2001

(65) Prior Publication Data

US 2003/0086024 A1   May 8, 2003

(51) Int. Cl.
    *H04N 5/63* (2006.01)
(52) U.S. Cl. .................................... 348/730
(58) Field of Classification Search ............... 348/730; 363/62, 126, 146; 307/112, 116, 126, 125, 307/64, 66; 323/908; H04N 5/63
    See application file for complete search history.

(56) References Cited

U.S. PATENT DOCUMENTS

| 3,584,222 | A | * | 6/1971 | Nesbitt ..................... 250/206 |
| 3,932,770 | A | * | 1/1976 | Fantozzi ..................... 307/117 |
| 4,249,089 | A | * | 2/1981 | Wolford et al. ............. 307/140 |
| 4,626,892 | A |   | 12/1986 | Northrup et al. ........... 348/569 |
| 4,628,268 | A | * | 12/1986 | Matsubara .................. 324/418 |
| 4,628,431 | A | * | 12/1986 | Kayser ....................... 363/49 |
| 4,641,205 | A |   | 2/1987 | Beyers, Jr. .................. 386/83 |
| 4,651,342 | A |   | 3/1987 | Mengel .................... 455/151.1 |
| 5,029,005 | A |   | 7/1991 | Morris, Jr. ................... 348/632 |
| 5,175,441 | A | * | 12/1992 | den Hollander ............. 307/43 |
| 5,565,714 | A | * | 10/1996 | Cunningham ............... 307/112 |
| 5,579,197 | A |   | 11/1996 | Mengelt et al. ............ 361/93.4 |
| 5,920,186 | A | * | 7/1999 | Ninh et al. ................ 323/303 |
| 5,999,421 | A |   | 12/1999 | Liu .......................... 363/21.15 |
| 6,272,030 | B1 | * | 8/2001 | Oomura ....................... 363/62 |

FOREIGN PATENT DOCUMENTS

JP    404311173 A   * 11/1992

* cited by examiner

Primary Examiner—Michael H. Lee
(74) Attorney, Agent, or Firm—John L. Rogitz

(57) ABSTRACT

A micro-power stand-by system is provided which minimizes power supplied to and the utilization of a stand-by power supply circuit and the resultant production of electromagnetic interference (EMI) during normal electronic device operation. In one embodiment, the stand-by power supply circuit includes at least one capacitor in electrical communication with at least one stand-by relay, with the capacitor electrically connected to an AC line. The capacitor powers the stand-by power supply circuit and the stand-by relay. At least one switch is located a prearranged distance from a main power supply circuit, and is electrically connected to the AC line and the stand-by relay to provide normal operation for the main power supply circuit. In another embodiment, the switch includes a stand-by switch and a main power switch which provide an inrush current limiting resistor during initial power-on for safety reasons and a bypass of the inrush current limiting resistor during normal operation, respectively.

12 Claims, 2 Drawing Sheets

MICRO-POWER STAND-BY MODE

This application incorporates herein by reference Patent Application Ser. No. 10/005668, by John Libera, entitled STAND-BY POWER SUPPLY SHUTDOWN AT POWER ON, filed concurrently herewith.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of power supply circuits. More particularly, this invention relates to a micro-power stand-by system and method for operation.

BACKGROUND OF THE INVENTION

Power supply circuits are utilized in electronic devices to provide continuous operation. For example, a television set utilizes a power supply circuit to provide electrical power for reception and transmission of broadcast, cable or satellite signals to a user. Many electronic devices include a standby mode which provides electrical power to an electronic device for activating such devices for normal operation. Again for example, a present-day television set is equipped with a low power stand-by power supply circuit, to activate the television set and operate at times when the television set is in a power-off mode.

The stand-by power supply circuit provides electrical power to a micro-controller and infra-red receiver such that the power-on may be accomplished by a remote control at any time. Contrary to what the term "stand-by power supply" implies, the stand-by power supply circuit does not stop working when the television set is in power-on mode, the circuit also remains fully operational in power-on mode to keep delivering electrical power to the micro-controller and other digital circuits. In essence, stand-by power supply circuits provide continuous electrical power to electronic devices both in power-on and power-off modes.

Growing awareness to environmental pollution in the United States of America (U.S.) and abroad has resulted in the Energy Star program developed by the U.S. Department of Energy and introduced in the U.S. in 1997 by the U.S. Environmental Protection Agency. The Energy Star regulations enacted in the U.S. are expected to cut environmental waste and decrease power consumption. However, a drastic reduction in power consumption leads to a decreased operational efficiency for electronic devices due to a necessarily over-rated specification and operation of the stand-by power supply circuit. For example, reduction in power consumption of the stand-by power supply circuit does not obliterate the increase power needed for operation of an AC relay. As the need for reduced power consumption grows it would be desirable to provide electronic devices that reduce power consumption without producing resulting operational inefficiencies.

SUMMARY OF THE INVENTION

In view of the foregoing, a micro-power operation system is provided that reduces power consumption without producing resulting operational inefficiencies.

In particular, and in one embodiment, a stand-by power supply circuit includes at least one capacitor in electrical communication with at least one stand-by relay, with the capacitor electrically connected to an AC line. The capacitor powers the stand-by power supply circuit and the stand-by relay. At least one switch is located a prearranged distance from a main power supply circuit, and is electrically connected to the AC line and the stand-by relay to provide normal operation for the main power supply circuit.

In one embodiment, a method for operating in micro-power stand-by mode includes connecting the AC line to the main power supply circuit via the switch in a power-on mode. In a further embodiment, the stand-by relay initially connects the AC line to the main power supply circuit and a main power relay continues the connection of the AC line to the main power supply circuit to guarantee uninterrupted and cost-effective power consumption while minimizing the utilization of the stand-by power supply circuit and the production of electro-magnetic interference (EMI). In an alternate embodiment, the main power supply circuit utilizes an inrush current limiting resistor during initial power-on for safety reasons.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to an embodiment(s), it will be understood that various changes and modifications may be made without departing from the spirit and scope of this invention. It is intended that the appended claims be interpreted to cover the embodiments described herein and all equivalents thereto.

Figure 1:
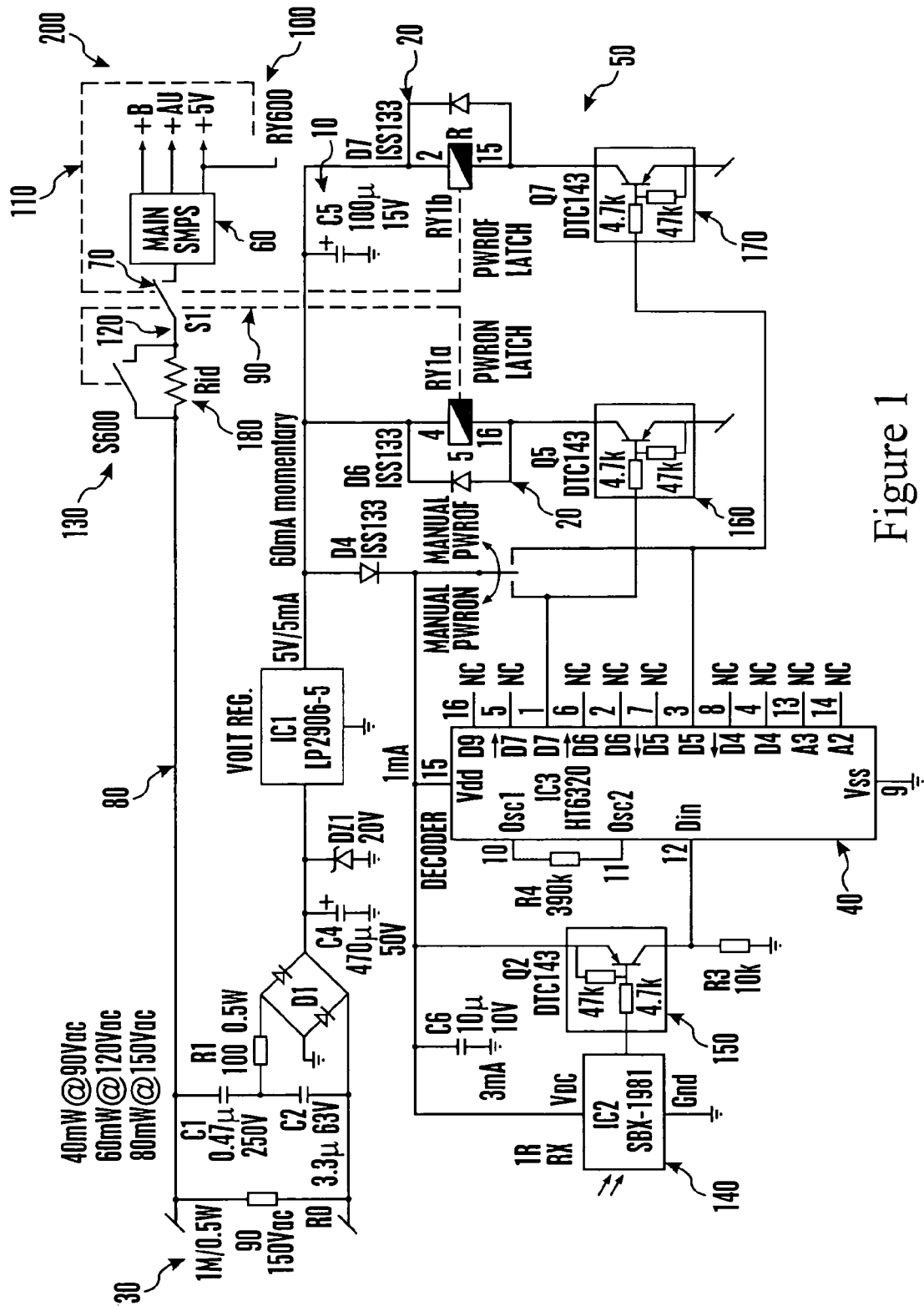
FIG. 1 is a block diagram of one embodiment of a micro-power operation system including a micro-power stand-by power supply circuit and a main power supply circuit with at least one switch for connecting an AC line to the main power supply circuit.

Turning now to FIG. 1, one embodiment of a micro-power operation system 200 is shown. Micro-power operation system 200 includes a micro-power stand-by power supply circuit 50 and a main power supply circuit 60. In one embodiment, stand-by power supply circuit 50 includes at least one capacitor 10 in electrical communication with at least one stand-by relay 20. Capacitor 10 is electrically connected to, and receives power from, an AC line 30 to supply power to stand-by power supply circuit 50 and stand-by relay 20. Stand-by relay 20 is also electrically connected to a MOS decoder 40.

In one embodiment, at least one switch 70 is located a prearranged distance from main power supply circuit 60 and electrically connected to AC line 30 by a connection 80 and stand-by relay 20 by a connection 90. In one embodiment, main power supply circuit 60 includes at least one main power relay 100 that is electrically connected to switch 70 by a connection 110. Stand-by relay 20 is configured to operate switch 70 to connect AC line 30 to main power supply circuit 60. In one embodiment, stand-by relay 20 is a magnetically latched stand-by relay, and main power relay 100 is a normal relay. In a further embodiment, switch 70 includes a stand-by switch 120 and a main power switch 130, with stand-by relay 20 configured to operate stand-by switch 120 through connection 90 and main power relay 100 configured to operate main power switch 130 through connection 110.

In micro-power stand-by operation, an electronic device (not shown), is provided with micro-power operation system 200 to reduce consumed power without producing resulting operational inefficiencies. For example, a television (not shown) may be provided with micro-power operation system 200 to reduce consumed power and electro-magnetic interference caused by stand-by power supply circuit 50 during a power-on operation/mode (not shown) of the electronic device.

This is accomplished by AC line 30 providing power to capacitor 10. Stand-by power supply circuit 50 delivers a rather thin but sufficient stream of power at less than 5 v/5 mA. Capacitor 10 stores enough power to activate stand-by relay 20 which needs electrical energy only during very brief switching periods to move its contacts 70 to an ON or an OFF position. Stand-by relay 20 remains in either state, ON or OFF, indefinitely with no current passing through its coils. MOS decoder 40 deciphers ON or OFF commands coming from an infra-red remote commander (not shown) via an infra-red (IR) receiver 140. A phase inverter 150 inverts the phase of incoming IR signal from IR receiver 140 while a phase inverter 160 drives one section of stand-by relay 20 during power-on mode/ON command and a phase inverter 170 drives the other section of stand-by relay 20 during power-off mode/OFF command.

In one embodiment, in a power-off mode, stand-by relay 20 and main power relay 100 have their contacts 120 and 130, respectively, open and the electronic device consumes only about 0.1 Watt of power needed for a stand-by power supply. In power-on mode, stand-by relay 20 closes its contact 120 and through connection 90 connects AC line 30 to main power supply circuit 60 and turns on a main power supply through an inrush current limiting resistor 180. Once activated, main power supply circuit 60 supplies power to main power relay 100 which closes main power switch 130 through connection 110, capacitor 10 is recharged and stand-by power supply circuit 50 emits no EMI. Main power supply circuit 60 is configured to power main power relay 100 once AC line 30 is initially connected to main power supply circuit 60 via stand-by switch 120.

Main power relay 100 is configured to operate main power switch 130 and continue connection of AC line 30 to main power supply circuit 60 and bypass inrush current limiting resistor 180 and begin normal operation of the electronic device. Reception of the OFF command activates phase inverter 170 to activate stand-by relay 20 which opens its contact 120 and through connection 90 disconnects AC line 30 from main power supply circuit 60 and turns off the main power supply. The disconnection of AC line 30 from main power supply circuit 60 turns off the power supplied to main power relay 100 which opens main power switch 130 through connection 110 and prepares micro-power operation system 200 for the next ON command and the next power-on mode.

Figure 2:
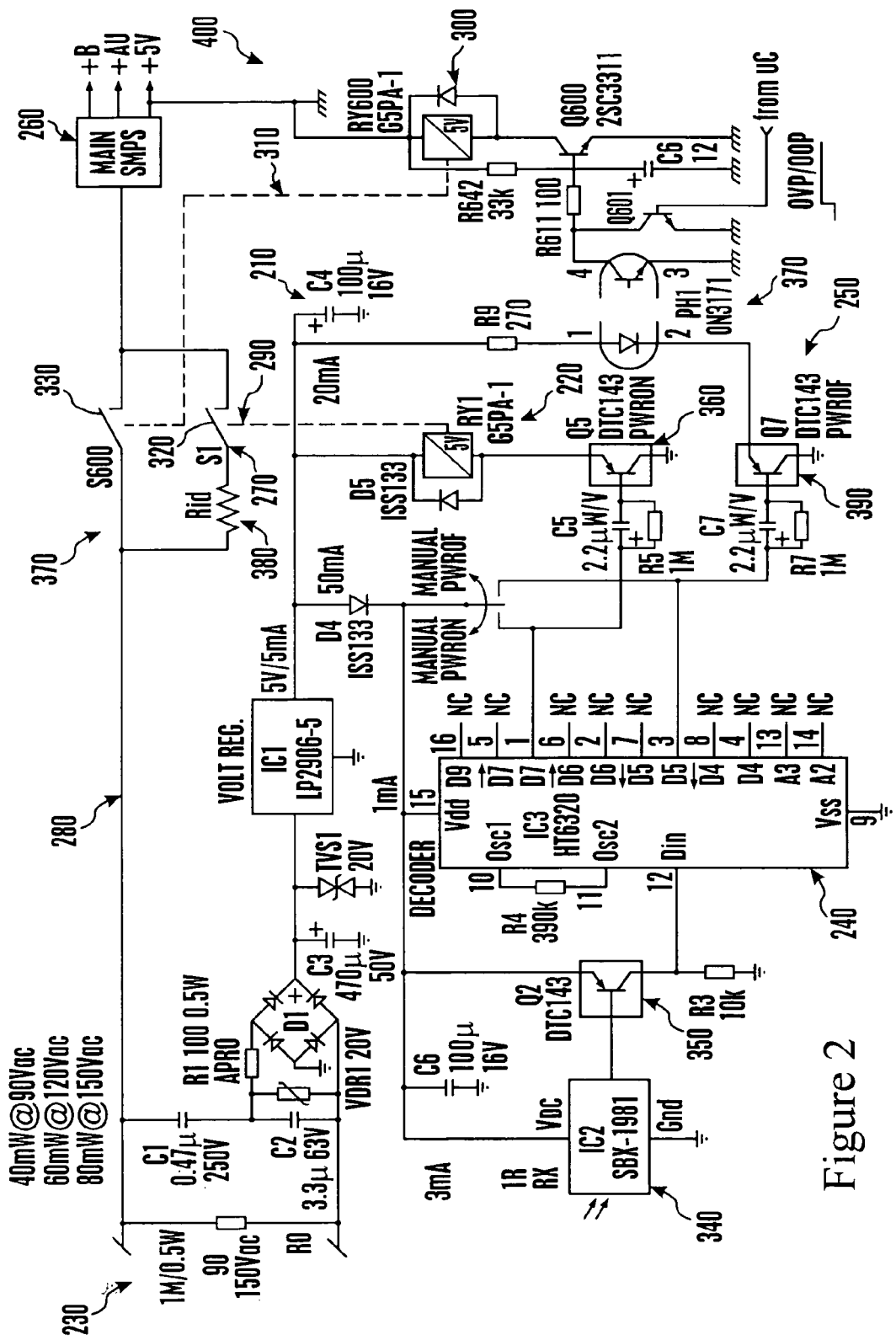
FIG. 2 is a block diagram of another embodiment of a micro-power operation system including another embodiment of a micro-power stand by power supply circuit and a main power supply circuit with at least one switch for connecting the AC line to the main power supply circuit.

FIG. 2 is another embodiment of a micro-power operation system 400. In another embodiment, micro-power operation system 400 includes a micro-power stand-by power supply circuit 250 optically coupled to a main power supply circuit 260. In one embodiment, stand-by power supply circuit 250 includes at least one capacitor 210 in electrical communication with at least one stand-by relay 220. Capacitor 210 is electrically connected to, and receives power from, an AC line 230 to supply power to stand-by power supply circuit 250 and stand-by relay 220. Stand-by relay 220 is also electrically connected to a MOS decoder 240.

In one embodiment, at least one switch 270 is located a prearranged distance from main power supply circuit 260 and is electrically connected to AC line 230 by a connection 280 and stand-by relay 220 by a connection 290. In one embodiment, main power supply circuit 260 includes at least one main power relay 300 that is electrically connected to switch 270 by a connection 310. Stand-by relay 220 is configured to operate switch 270 to connect AC line 230 to main power supply circuit 260. In one embodiment, switch 270 includes a stand-by switch 320 and a main power switch 330, with stand-by relay 220 configured to operate stand-by switch 320 through connection 290 and main power relay 300 configured to operate main power switch 330 through connection 310.

In micro-power stand-by operation, an electronic device (not shown), is provided with micro-power operation system 400 to reduce consumed power without producing resulting operational inefficiencies. Again by example, a television (not shown) may be provided with micro-power operation system 400 to reduce consumed power and electro-magnetic interference caused by stand-by power supply circuit 250 during a power-on operation/mode (not shown) of the electronic device.

This is accomplished by AC line 230 providing power to capacitor 210. Stand-by power supply circuit 250 delivers a rather thin but sufficient stream of power at less than 5 v/5 mA. Capacitor 210 stores enough power to activate stand-by relay 220 which needs electrical energy only during very brief switching periods to move its contacts 270 to an ON position. Stand-by relay 220 operates just long enough for main power supply circuit 260 to supply power to main power relay 300 and activate main power switch 330. MOS decoder 240 deciphers ON or OFF commands coming from an infra-red remote commander (not shown) via an infra-red (IR) receiver 340. A phase inverter 350 inverts the phase of incoming ON command and IR signal from IR receiver 340 while a phase inverter 360 drives stand-by relay 220 during the power on operation. During the execution of a power-off command, the command is carried out by means of an opto-coupler 370 that de-activates main power relay 300 which opens its contact 330 and through connection 310 disconnects AC line 230 from main power supply circuit 260 and turns off the main power.

In one embodiment, in a power-off mode, stand-by relay 220 and main power relay 300 have their contacts 320 and 330, respectively, open and the electronic device consumes only about 0.1 Watt of power needed for a stand-by power supply. In a power-on mode, stand-by relay 220 closes its contact 320 and through connection 290 connects AC line 230 to main power supply circuit 260 and turns on a main power supply through an inrush current limiting resistor 380. Once activated, main power supply circuit 260 supplies power to main power relay 300 which closes main power switch 330 through connection 310, capacitor 210 is recharged and stand-by power supply circuit 250 emits no EMI. Main power supply circuit 260 is configured to power main power relay 300 once AC line 230 is initially connected to main power supply circuit 260 via stand-by switch 320.

Main power relay 300 is configured to operate main power switch 330 and continue connection of AC line 230 to main power supply circuit 260 and bypass inrush current limiting resistor 380 and begin normal operation of the electronic device. Reception of the OFF/power-off command activates a phase inverter 390 to activate opto-coupler 370 and main power relay 300 which opens its contact 330 and through connection 310 disconnects AC line 230 from main power supply circuit 260 and turns off the main power supply. The disconnection of AC line 230 from main power supply circuit 260 through connection 280 prepares micro-power operation system 400 for the next ON/power-on command and the next power-on mode.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A television comprising:
   a stand-by power supply circuit including at least one capacitor in electrical communication with at least one stand-by relay, said capacitor electrically connected to an AC line, said stand-by relay electrically connected to a MOS decoder, said capacitor configured to power said stand-by power supply circuit and said stand-by relay; and
   at least one switch located prearranged distance from a main power supply circuit, said switch electrically connected to said AC line and said stand-by relay, wherein said main power supply circuit comprises at least one main power relay, said main power relay electrically connected to said switch, said stand-by relay configured to operate said switch to connect said AC line to said main power supply circuit.

2. A television in accordance with claim 1, wherein said main power supply circuit configured to power said main power relay once said AC line is initially connected to said main power supply circuit, said main power relay configured to operate said switch and continue connection between said AC line and said main power supply circuit.

3. A television in accordance with claim 1, wherein said stand-by relay is a magnetically latched stand-by relay.

4. A television in accordance with claim 1, wherein said main power relay is a magnetically latched main power relay.

5. A television in accordance with claim 1, wherein said switch comprises a stand-by switch and a main power switch, said stand-by relay configured to operate said stand-by switch and said main power relay configured to operate said main power switch.

6. A micro-power operation system comprising:
   a stand-by power supply circuit including at least one capacitor in electrical communication with at least one stand-by relay, said capacitor electrically connected to an AC line, said capacitor configured to power said stand-by power supply circuit and said stand-by relay; and
   a main power supply circuit including at least one switch in electrical communication with at least one main power relay, said switch electrically connected to said AC line.

7. A micro-power operation system in accordance with claim 6, further comprising an inrush current limiting resistor located between said AC line and said switch.

8. A micro-power operation system in accordance with claim 7, wherein said stand-by relay configured to operate said switch to connect said AC line to said main power supply circuit and said inrush current limiting resistor configured to handle a predetermined current.

9. A micro-power operation system in accordance with claim 8, wherein said main power supply circuit configured to power said main power relay once said AC line is initially connected to said main power supply circuit, said main power relay configured to operate said switch and continue connection between said AC line and said main power supply circuit.

10. A micro-power operation system in accordance with claim 6, wherein said switch comprises a stand-by switch and a main power switch, said stand-by relay configured to operate said stand-by switch and said main power relay configured to operate said main power switch.

11. A micro-power operation system in accordance with claim 10, further comprising an inrush current limiting resistor located between said AC line and said stand-by switch, said main power switch configured to bypass said inrush current limiting resistor and connect said AC line to said main power supply circuit.

12. A micro-power operation system in accordance with claim 11, wherein said main power supply circuit configured to power said main power relay once said AC line is initially connected to said main power supply circuit via said stand-by switch, said main power relay configured to operate said main power switch and continue connection between said AC line and said main power supply circuit.

* * * * *